United States Patent [19]

Funakoshi et al.

[11] Patent Number: 5,194,267
[45] Date of Patent: Mar. 16, 1993

[54] TIRE VULCANIZING PRESS

[75] Inventors: Senzo Funakoshi; Yasuhiko Fujieda, both of Kobe, Japan

[73] Assignee: Kabushiki Kaisha Kobe Seiko Sho, Kobe, Japan

[21] Appl. No.: 879,950

[22] Filed: May 8, 1992

[30] Foreign Application Priority Data

May 8, 1991 [JP] Japan .................................. 3-133425
May 8, 1991 [JP] Japan .................................. 3-133426
May 8, 1991 [JP] Japan .................................. 3-133427

[51] Int. Cl.$^5$ .............................................. B29C 35/00
[52] U.S. Cl. .................... 425/47; 425/450.1; 425/595
[58] Field of Search ............... 425/28.1, 47, 450.1, 425/451.9, 595

[56]  References Cited
U.S. PATENT DOCUMENTS 4,318,682  3/1982  Layson et al. .................... 425/47 R
4,453,902  6/1984  Imberl .................................. 425/47
4,927,344  5/1991  Amano et al. .................... 425/47 X Primary Examiner—Charles Hart
Attorney, Agent, or Firm—Oblon, Spivak, McClelland, Maier & Neustadt

[57] ABSTRACT

The present invention relates to a tire vulcanizing press which presses to fasten an upper and a lower molds used for vulcanizing a tire by hydraulic cylinders and raises and lowers the upper mold in an up-and-down direction to remove the tire being finished a vulcanizing processing.

In the tire vulcanizing press in accordance with the present invention, since the plurality of tie rods hung from the upper mold installation member are respectively connected through the lock device to the cylinder rod of the fastening cylinder and the lower mold installation member to which the fastening cylinder is fixed is pressed to rise toward the upper mold installation member, only the tie rods are positioned around the upper and the lower molds. Therefore, a maintenance of the upper and the lower molds becomes easy, and it also becomes possible to reduce the apparatus size of the tire vulcanizing press as a whole.

3 Claims, 6 Drawing Sheets

TIRE VULCANIZING PRESS

BACKGROUND OF THE INVENTION

The present invention relates to a tire vulcanizing press which presses to fasten an upper and a lower molds used for vulcanizing a tire by hydraulic cylinders and raises and lowers the upper mold in an up-and-down direction to remove the tire being finished a vulcanizing processing.

There have been known this type of various tire vulcanizing presses which presses to fasten an upper and a lower molds used for vulcanizing a tire by hydraulic cylinders and raises and lowers the upper mold in an up-and-down direction to remove the tire being finished a vulcanizing processing. If classified in view of a press frame receiving a reaction force from a hydraulic fastening cylinder, they are chiefly classified into a rectangular frame type and a dome lock type. Already known ones as a rectangular frame type are disclosed in Japanese Unexamined Patent Application No. SHO 59-12827, Japanese Unexamined Patent Application No. SHO 61-134210, and Japanese Unexamined Patent Application No. SHO 63-118209 This rectangular frame type requires a firm frame construction sufficient to receive a reaction force from the hydraulic fastening cylinder and a transmission member disposed retractably to support the reaction force between the upper mold and the press frame.

Therefore, to simplify the frame construction and omit the supporting member, the dome lock type is constituted such that the upper and the lower molds are accommodated in an upper and lower domes provided to be opened or closed so that the upper and the lower molds can be pressed in the upper and the lower domes. Already known ones as a dome lock type are disclosed in Japanese Unexamined Patent Application No. SHO 56-161139 and Japanese Unexamined Patent Application No. SHO 59-138432.

Next, referring to FIG. 6, a dome lock type tire vulcanizing press which is disclosed in above Japanese Unexamined Patent Application No. SHO 59-138432 is explained. A reference numeral 1 denotes a lower mold, and a reference numeral 2 denotes an upper mold. A reference numeral 3 denotes a lower mold installation member such as a lower platen, and a reference numeral 4 denotes an upper mold installation member such as an upper platen. And further, a reference numeral 5 denotes a lower dome, and a reference numeral 6 denotes an upper dome. A reference numeral 7 denotes a lock device, and a reference numeral 8 denotes a fastening cylinder. Moreover, a reference numeral 9 denotes a raise/lower cylinder, and a reference numeral 10 denotes a base frame. A reference numeral 11 denotes a stand frame, and a reference numeral 12 denotes a mold height adjusting device.

The lower mold 1 is installed on the lower mold installation member 3 by means of bolts etc. And, the lower mold installation member 3 is fixed on the base frame 10 by supporting rods 13, the fastening cylinder. The upper mold 2 is installed on the upper mold installation member 4 by means of bolts etc. And, the upper mold installation member 4 is fixed on the upper dome 6 through the mold height adjusting device 12 (which absorbs height difference between the upper mold 2 and the lower mold 1 in the case that the upper mold 2 and the lower mold 1 are formed in such a manner that either one has a taller height than the other).

The lower dome 5 is provided to be slightly raised or lowered by being guided by the supporting rods 13. The fastening cylinder 8 is installed on the lower surface of the lower dome 5, and a cylinder rod $8a$ is connected to the lower mold installation member 3. The upper dome 6 is installed on a lateral frame 14, and the lateral frame 14 is guided by the stand frame 11. The raise/lower cylinder 9 is connected to the stand frame 11. The lock device 7 is a means for connecting or disconnecting the upper dome 6 and the lower dome 5, and for example a bayonet-lock is used as this lock device 7.

The following is an explanation of an operation of above-described dome lock type tire vulcanizing press. First of all, an opening and closing operation is explained. If the raise/lower cylinder 9 is extended when the lock device 7 is in a disengaging condition, the lateral frame 14 rises by being guided by the stand frame 11. And, the upper dome 6, the upper mold installation member 4 and the upper mold 2 are positioned at their raised positions as shown by a two-dot long and two short dashes line so that an installation of a green tire or taking-out of the molded tire can be carried out. To the contrary, if the raise/lower cylinder 9 is contracted, the upper dome 6 is positioned at a solid line. And, a closing operation is finished by connecting the upper and the lower domes 5 and 6 by means of the lock device 7.

Next, a fastening operation of the upper and the lower molds 1, 2 is explained. When a pressurized oil is supplied into a port a of the fastening cylinder 8, the lower dome 5 connected to the fastening cylinder 8 is pressed toward a downward direction. The upper dome 6 is connected to the lower dome 5 by the lock-device 7, therefore the upper dome 6, the upper mold installation member 4; i.e. the upper mold 2, are lowered together, so that a pressurization can be performed between the upper and the lower molds 1, 2.

In the dome lock type tire vulcanizing press, since the upper mold installation member 4 is accommodated in the cylindrical dome 6, there is no maintenance space for maintaining heated vapor pipes of the upper and the lower platens. Therefore, there was a problem such that a maintenance work is difficult. Moreover, it was necessary to make the upper and the lower domes 5 and 6 to be thick so as to support the upper and the lower molds 1, 2. Therefore, there was a problem such that a tire vulcanizing press needs to increase its apparatus size as a whole. Especially, as shown in the drawing, in the case that there are provided a pair of right and left molds, it is necessary to keep a significant distance between the right and left molds in order to prevent the upper and the lower domes 5, 6 and the lock device 7.

SUMMARY OF THE INVENTION

The present invention has been done, in view of above conventional problems encountered in the prior art technologies, and has a purpose to provide a tire vulcanizing press capable of facilitating a maintenance around the upper mold installation member or the lower mold installation member and reducing the apparatus size as a whole. Furthermore, in the case that a plurality of lock devices are used in order to reduce the size, it is a purpose of the present invention to provide a tire vulcanizing press capable of causing them to operate at the same timing. Moreover, even in the case that the lower mold installation member is lifted toward the upper mold installation member by using a tie rod, it is a purpose of the present invention to a tire vulcanizing press capable of fixing the lower mold installation member at a predetermined position when the press is opened.

To accomplish the above purposes, according to the present invention, there is provided a tire vulcanizing press comprising: an upper mold installation member supported to be raised or lowered along a stand frame; a lower mold installation member mounted on a base frame to be slightly shiftable in an up-and-down direction; a plurality of tie rods hung from the upper mold installation member; a plurality of fastening cylinders fixed on the lower mold installation member and having cylinder rods facing to the tie rods; and a lock device for connecting or disconnecting between a tip end of the cylinder rod and a tip end of the tie rod. Furthermore, in accordance with the above-described tire vulcanizing press, there is provided a rod for connecting a plurality of lock devices with each other and one actuating means for causing the lock devices to operate at the same time. Moreover, in accordance with the above-described tire vulcanizing press, there is provided a twin-rod cylinders having an upper and a lower cylinder rods as the fastening cylinder, so that the lower cylinder rod is engaged with the base frame.

Hereinafter, an operation of the tire vulcanizing press in accordance with the present invention is explained. A plurality of tie rods hung from the upper mold installation member are respectively connected through the lock device to the cylinder rod of the fastening cylinder. The lower mold installation member to which the fastening cylinder is fixed is pressed to rise toward the upper mold installation member. Further, a plurality of lock devices connected by the rod are controlled by one actuating means so as to be connected or disconnected together. Moreover, when the lower cylinder rod of the fastening cylinder is fastened, the lower mold installation member is fixed on the base frame.

In the tire vulcanizing press in accordance with the present invention, since the plurality of tie rods hung from the upper mold installation member are respectively connected through the lock device to the cylinder rod of the fastening cylinder and the lower mold installation member to which the fastening cylinder is fixed is pressed to rise toward the upper mold installation member, only the tie rods are positioned around the upper and the lower molds. Therefore, a maintenance of the upper and the lower molds becomes easy, and it also becomes possible to reduce the apparatus size of the tire vulcanizing press as a whole.

Further, since the plurality of lock devices connected by the rod are controlled by one actuating means so as to be connected or disconnected together, it is not feared to cause a timing lag between them. Moreover, since the lower mold installation member is fixed on the base frame when the lower cylinder rod of the fastening cylinder is fastened, it is not also feared that a standard point for the installation of the lower mold installation member is displaced when the press is opened even by the structure such that the lower mold installation member is pressed to rise toward the upper mold installation member.

The above and other objects, features and advantages of the present invention will become more apparent from the following detailed description and the appended claims which are to be read in conjunction with the accompanying drawings. However, the drawings are merely illustrative and not restrictive to limit the scope of the invention.

DETAIL DESCRIPTION OF THE PREFERRED EMBODIMENT

Figure 1:
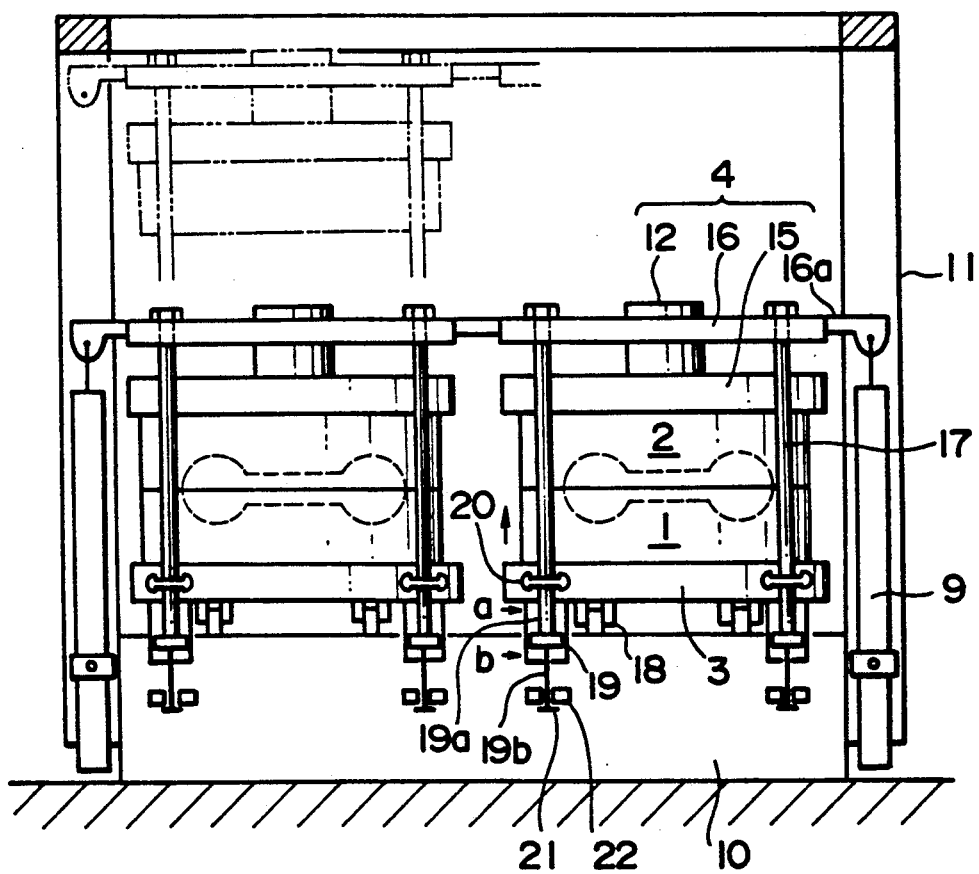
FIG. 1 is a schematic view showing a tire vulcanizing press in accordance with the present invention.

Hereinafter, referring now to the accompanying drawings, a preferred embodiment of the present invention is explained in detail. FIG. 1 is a schematic view showing a tire vulcanizing press in accordance with the present invention, and FIGS. 2 through 5 show its specific structures.

Figure 6:
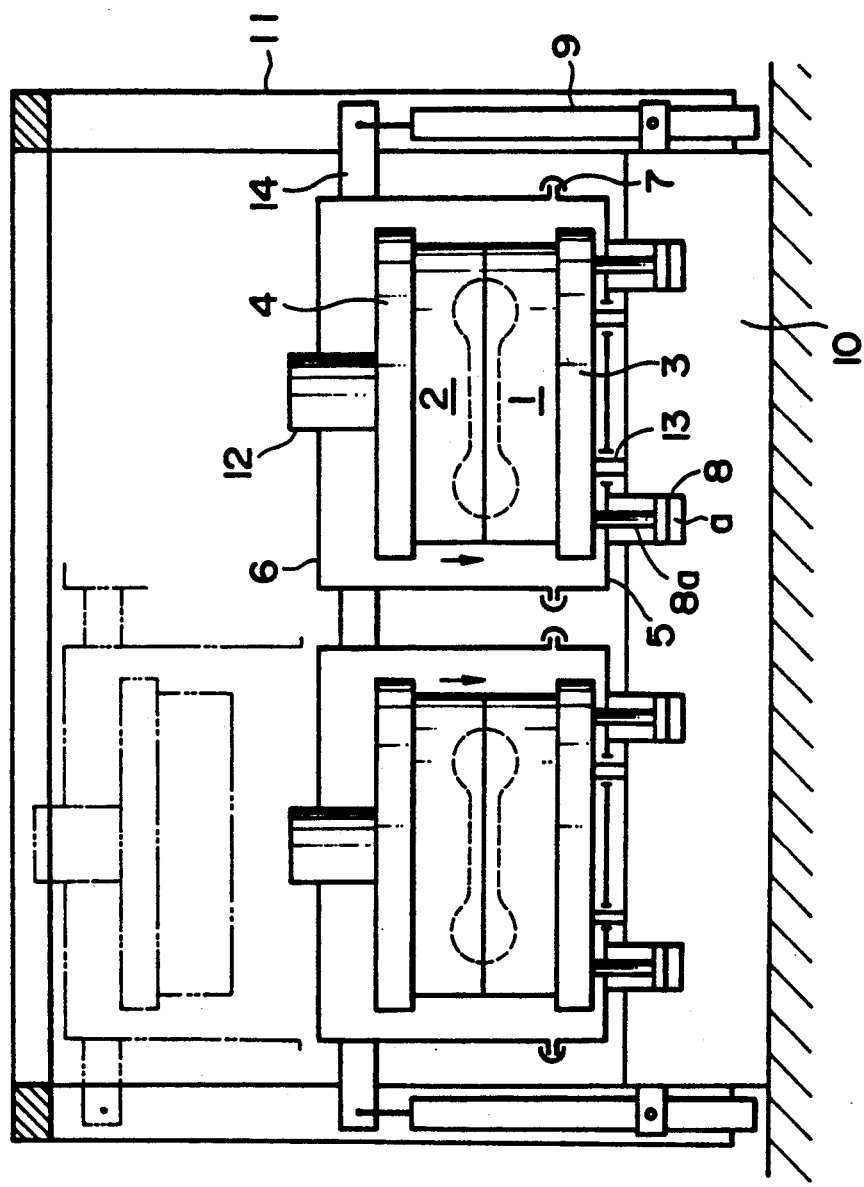
FIG. 6 is a schematic view showing a conventional tire vulcanizing press.

In FIG. 1, different points from FIG. 6 are chiefly explained. The portion performing the same operation as the disclosed one of FIG. 6 is suffixed by the same reference numeral and omitted its explanation. The upper mold installation member 4 consists of the upper plate 15, the mold height adjusting device 12 and the upper plate 16. Four tie rods 17 are hung from the upper plate 16. This upper plate 16 is an integral structure common to the right and left molds, and guided by the right and left stand frame 11. Moreover, the rise/lower cylinder 9 is connected to a protruding portion 16a of the upper plate 16. The lower mold installation member 3 is inserted in the guide rod 18 planted on the base plate 10, so that the lower mold installation member 3 can be slightly shiftable on the base plate 10 in an up-and-down direction. The fastening cylinder 19 is a twin-rod cylinder capable of moving differently, and fixed on the lower mold installation member 3. An upper tip end of the cylinder rod 19a is disposed to face to a lower tip end of the tie rod 17, and the lock device 20 is disposed to be opened or closed between this opposing portion. A nut 21 is screwed onto the lower tip end of the tie rod 19b, and is engaged with a stopper 22 provided on the side wall of the base frame so as to project.

The following is an explanation about an operation of the tire vulcanizing press with arrangement described above. First of all, an opening and closing operation is explained. If the raise/lower cylinder 9 is extended when the lock device 20 is in a disengaging condition, the upper plate 16 rises by being guided by the stand frame 11. And, the upper mold installation member 4 is positioned at its raised position as shown by a two-dot long and two short dashes line so that an installation of a green tire or taking-out of the molded tire can be carried out. To the contrary, if the raise/lower cylinder 9 is contracted, the upper mold installation member 4 is positioned at a solid line. And, a closing operation is finished by placing the tip end of the tie rod 17 and the tip end of the cylinder rod 19a to face with each other and connecting the tie rod 17 and the cylinder rod 19a by means of the lock device 20.

Next, a fastening operation of the upper and the lower molds 1, 2 is explained. When a pressurized oil is supplied into a port a of the fastening cylinder 19, since the cylinder rod 19a and the tie rod 17 are connected with each other, the fastening cylinder 19 itself; i.e. the lower mold installation member 3 is lifted so as to apply a pressure between the upper and the lower molds 1, 2. Hereupon, even if there is a slight height difference between the right and the left mold height adjusting devices 12, this slight height difference can be absorbed because the lower mold 1 is independently lifted. (In FIG. 6, since the stationary lower mold 1 is pressed, it is feared the height difference between the right and the left mold height adjusting devices 12 may cause a pushing pressure difference.)

Figure 2:
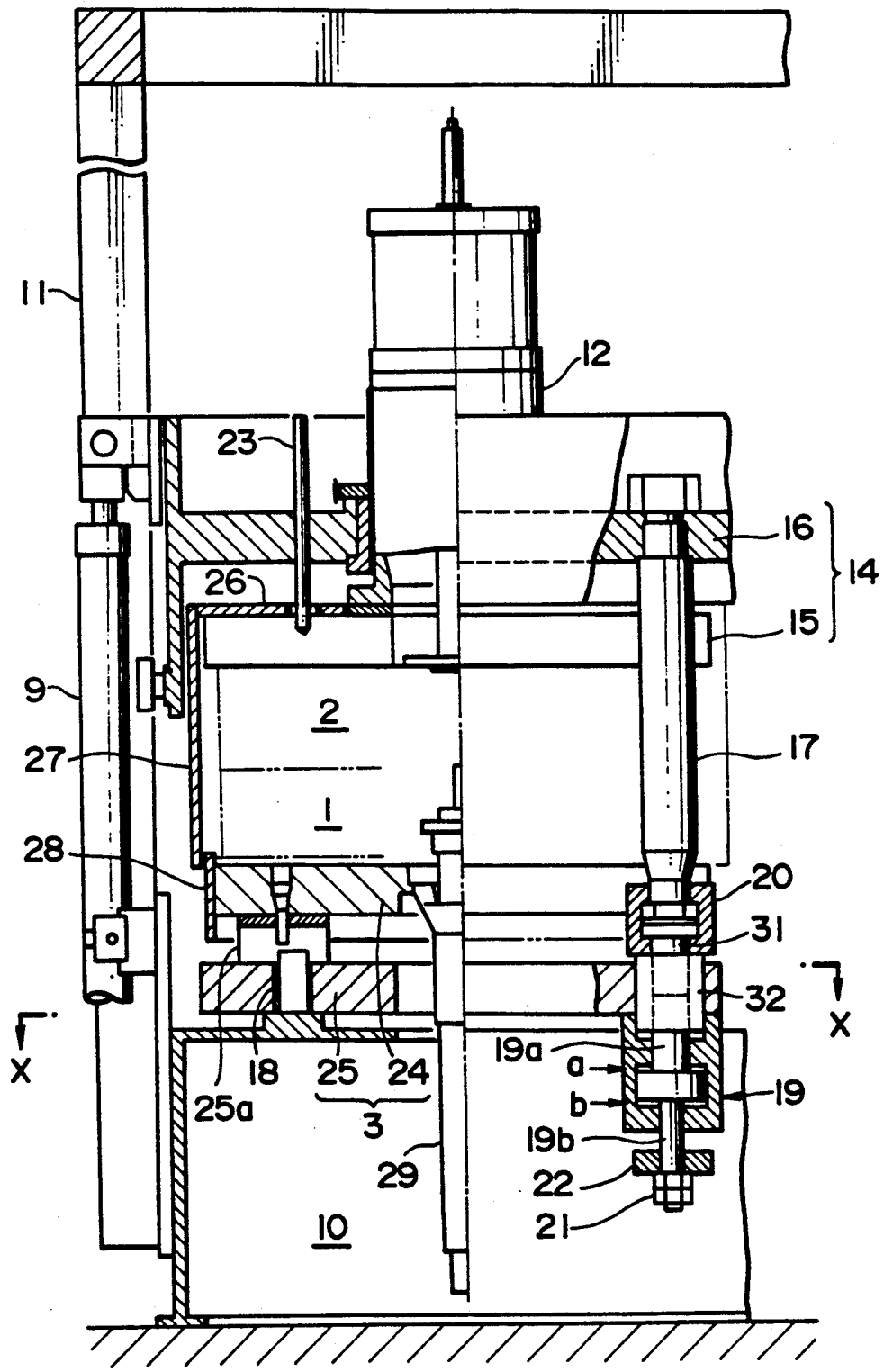
FIG. 2 is a half sectional front view of the tire vulcanizing press in accordance with the present invention.
Figure 3:
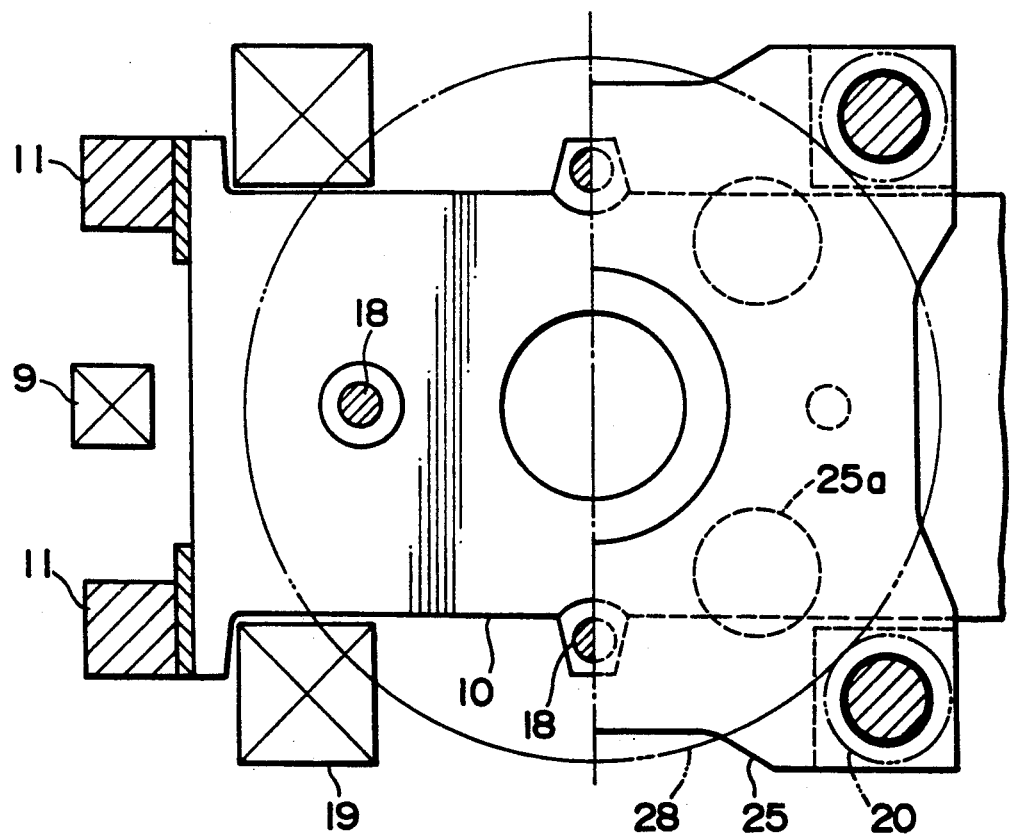
FIG. 3 is a cross-sectional view taken along a line X—X of FIG. 2.

Next, referring to FIGS. 2 through 5, the specific structures of the embodiment is explained. FIG. 2 is a half sectional front view of the tire vulcanizing press in accordance with the present invention, and FIG. 3 is a cross-sectional view taken along a line X—X of FIG. 2. FIG. 4 is a view showing a lock device, and FIG. 5 is a view showing an opening/closing device of the lock device.

In FIGS. 2 and 3, the upper plate 16 and the upper platen 15 constituting the upper mold installation member 4 are connected with each other through the screw-type mold height adjusting device 12 and the guide rod 23 so as to be able to adjust their heights. The lower tip end of the tie rod 17 faces to the elongated member 31 of the cylinder rod 19a in the lock device 20. The lower mold installation member 3 consists of the lower platen 24 and the lower plate 25, and the lower platen 24 is fixed on the bosses 25a of the lower plate through an insulation material. The lower plate 25 is mounted on the base frame 10 through the guide rod 18. The upper platen 15 and the lower platen 24 are surrounded by the insulating plates 26, 27, and 28, which are respectively made of removable thin material because they have no relation with applied pressure. Accordingly, by removing the insulating plates 26, 27, and 28, a maintenance of the upper and the lower platens 15, 24 or the upper and the lower molds 1, 2 is easily carried out. Furthermore, as shown in FIG. 3, since the lock device 20 can be disposed as close to this insulating plate 28 as possible (on the other hand, the tie rod 17 is positioned as close to the insulating plate 27 as possible), it becomes possible to reduce the overall size of the press compared with the conventional dome lock type press.

As shown in FIG. 3, the fastening cylinder 19 is fixed on the lower surface of the lower plate 25 at a position not interfere with the base plate 10. The cylinder rod 19a of FIG. 2 is integrally connected with each other through the elongated member 31 and the coupling 32. The nut 21 is screwed onto the lower tip end of the cylinder rod 19b, and is engaged with the stopper 22 provided on the base frame 10 to project therefrom.

The reason why the fastening cylinder 19 is constituted by a twin-rod cylinder capable of moving differently is as follows. When the tire is taken out after finishing the vulcanizing processing, the center mechanism 29 is raised. Therefore, it is feared that the lower mold installation member 3 is raised together due to a frictional force and a force for tearing off the vulcanized tire from the mold. When a pressurized oil is introduced into a port b of the fastening cylinder 19, the main body of the fastening cylinder 19; i.e. the lower mold installation member 3, is lowered since the cylinder rod 19b is engaged with the stopper 22. Thus, the lower mold installation member 3 no longer rises beyond a predetermined lower limit position.

Figure 4A:
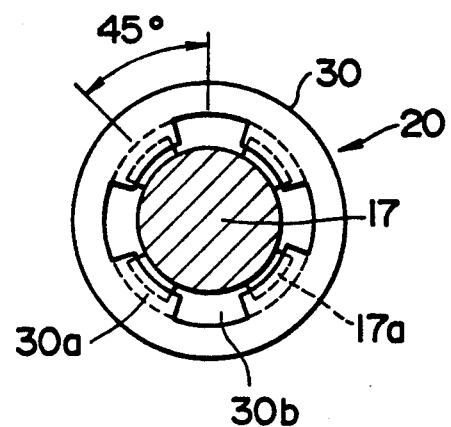
FIG. 4 is a view showing a lock device.
Figure 4B:
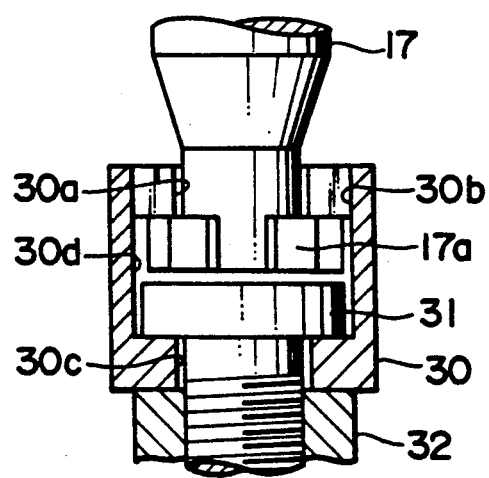

Next, referring to FIG. 4, the lock device 20 is explained in detail. FIG. 4(a) is a plane view, and FIG. 4(b) is a vertical sectional front view. This lock device 20 uses a rotary lock ring 30. The lock ring 30 is provided with four teeth 30a and four cutouts 30b on its upper portion. The lock ring 30 has a small radius hole 30c at its bottom and has a large diameter hole 30d at its intermediate portion. The tie rod 17 has a tip end formed four teeth 17a passing through the cutouts 30b. When the teeth 17a pass through the cutouts 30b, the tie rod 17 is released. And then, if the lock ring 30 turns 45 degrees, the teeth 17a and the teeth 30a are positioned in an engaging condition as shown in FIG. 4(a). Moreover, the elongated member 31 is inserted in the large diameter hole 30d, and the elongated member 31 and the lock ring 30 are fixed together by screwing the coupling 32 therein.

Figure 5A:
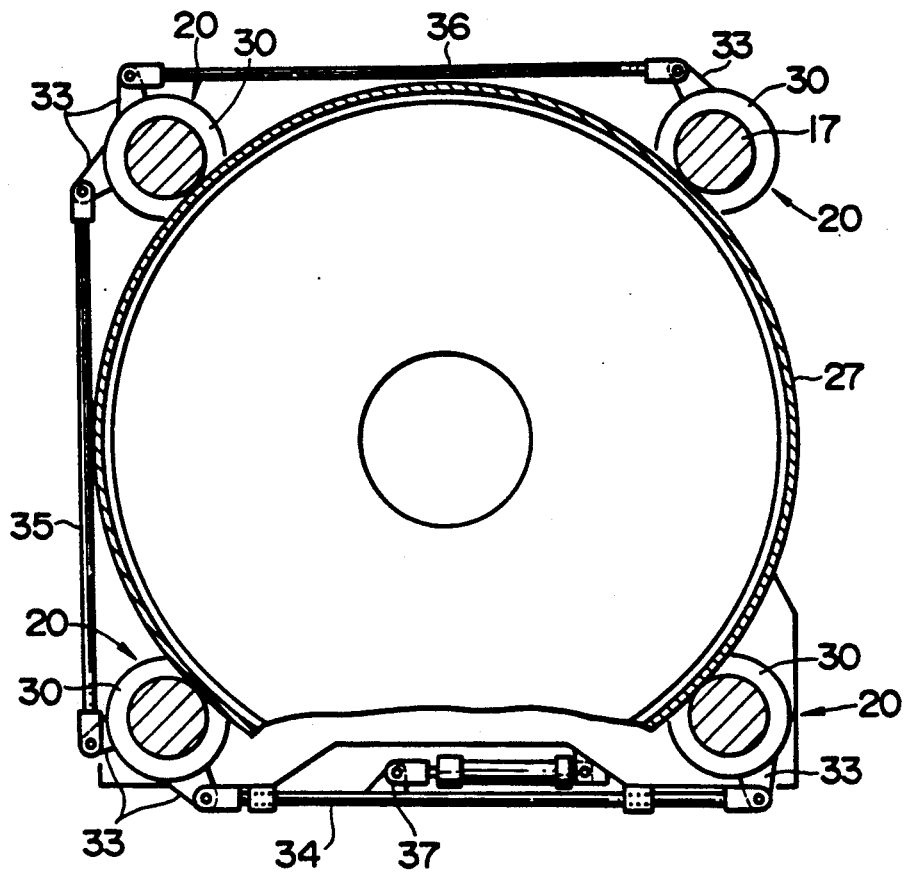
FIG. 5 is a view showing an opening/closing device of the lock device.
Figure 5B:
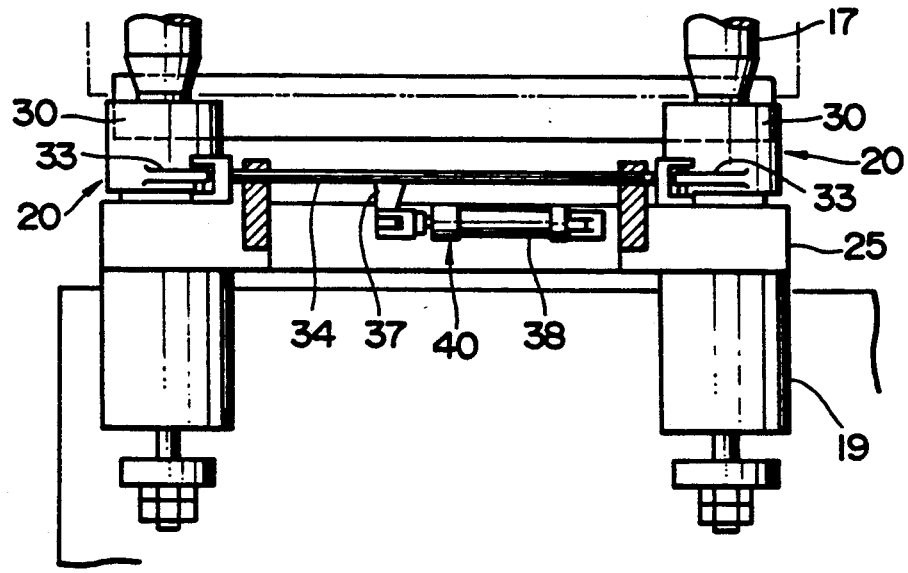

Next, referring to FIG. 5, an actuating device 40 of the lock device 20 is explained. FIG. 5(a) is a plane view, and FIG. 5(b) is a front view. Each of the lock rings 30 has one or two brackets 33 protruding thereon. The connecting rods 34, 35, and 36 are hingedly supported between the brackets 33. As shown in FIG. 5(a), the connecting rod 34 has a bracket 37 protruding thereon. Between this bracket 37 and the lower plate 25, there is provided a cylinder 38 as an actuating means. These connecting rods 34, 35, 36 and the cylinder 38 constitute the actuating device 40. If the cylinder 38 extends, the connecting rod 34 shifts toward a left direction in the drawing so that the right and left lock rings 30 rotate. The remaining lock ring 30 is also simultaneously rotated by the connecting rods 35, 36 of FIG. 5(a). Thus, four sets of lock devices are controlled to be connected or disconnected at the same time. By providing four tie rods 17, four sets of lock devices 20 are required. These lock devices 20 connect or disconnect the tie rods 17 and the cylinder rods of the fastening cylinders 19 at the same time by means of the above-described actuating device 40.

Having now fully described the present invention, it will be apparent to one of ordinary skill in the art that many changes and modifications can be made thereto without departing from the spirit and scope of the present invention as set forth herein.

What is claimed is:

1. A tire vulcanizing press comprising: an upper mold installation member supported to be raised or lowered along a stand frame; a lower mold installation member mounted on a base frame to be slightly shiftable in an up-and-down direction; a plurality of tie rods hung from the upper mold installation member; a plurality of fastening cylinders fixed on the lower mold installation member and having cylinder rods facing to the tie rods; and a lock device for connecting or disconnecting between a tip end of the cylinder rod and a tip end of the tie rod.

2. A tire vulcanizing press in accordance with claim 1 in which further comprising a rod for connecting a plurality of lock devices with each other and one actuating means for causing the lock devices to operate at the same time.

3. A tire vulcanizing press in accordance with claim 1 in which said fastening cylinder is a twin-rod cylinder having an upper and a lower cylinder rods, so that the lower cylinder rod is engaged with the base frame.

* * * * *